United States Patent
Bastide et al.

(10) Patent No.: US 9,483,455 B1
(45) Date of Patent: Nov. 1, 2016

(54) INGESTION PLANNING FOR COMPLEX TABLES

(71) Applicant: International Business Machines Corporation, Armonk, NY (US)

(72) Inventors: Paul R. Bastide, Boxford, MA (US); Matthew E. Broomhall, Goffstown, NH (US); Donna K. Byron, Petersham, MA (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/046,541

(22) Filed: Feb. 18, 2016

Related U.S. Application Data (63) Continuation of application No. 14/920,914, filed on Oct. 23, 2015.

(51) Int. Cl.
| | |
|---|---|
| *G06F 17/00* | (2006.01) |
| *G06F 17/24* | (2006.01) |
| *G06F 17/27* | (2006.01) |
| *G06F 17/30* | (2006.01) |

(52) U.S. Cl.
CPC ....... *G06F 17/245* (2013.01); *G06F 17/30719* (2013.01); *G06F 17/27* (2013.01); *G06F 17/3002* (2013.01); *G06F 17/30038* (2013.01); *G06F 17/30616* (2013.01)

(58) Field of Classification Search
CPC .. G06F 17/245; G06F 17/27; G06F 17/3002; G06F 17/30038; G06F 17/30719; G06F 17/30616
See application file for complete search history.

(56) References Cited

U.S. PATENT DOCUMENTS

| | | | | | |
|---|---|---|---|---|---|
| 5,950,196 | A | * | 9/1999 | Pyreddy | ............ G06F 17/30911 707/769 |
| 5,987,448 | A | * | 11/1999 | Evans | ............... G06F 17/30253 |
| 6,675,350 | B1 | * | 1/2004 | Abrams | ............ G06F 17/30719 705/21 |
| 7,792,829 | B2 | | 9/2010 | Brill et al. | |
| 8,010,905 | B2 | | 8/2011 | Ryan et al. | |

(Continued)

OTHER PUBLICATIONS

Wikipedia, "Natural language processing", printed on Nov. 26, 2014, http://en.wikipedia.org/wiki/Natural_language_processing, pp. 1-10.

(Continued)

*Primary Examiner* — William Bashore
*Assistant Examiner* — David Faber
(74) *Attorney, Agent, or Firm* — Reza Sarbakhsh (57) ABSTRACT

Embodiments of the present invention disclose a method, computer program product, and system for generating a plan for document processing. A plurality of electronic documents are received from a data store. The plurality of electronic documents are analyzed. Textual data within the identified tabular data are identified, by performing a first natural language search of the analyzed plurality of electronic documents. Textual hints are generated, where the generated textual hints are mapped to a lookup set. References are identified, and a count of identified references are determined. A priority score is calculating based on the count of identified references. In response to receiving a priority score modifying value, a modified priority score is calculated. Ingestion plans are generated based on the modified priority score. Generated ingestion plans are communicated by the computer using the network.

1 Claim, 8 Drawing Sheets

(56) References Cited

U.S. PATENT DOCUMENTS

| | | | |
|---|---|---|---|
| 8,090,717 B1 | 1/2012 | Bharat et al. | |
| 9,286,290 B2 * | 3/2016 | Allen | G06F 17/2785 |
| 2002/0154816 A1 * | 10/2002 | Gay | G06Q 40/12 |
| | | | 382/190 |
| 2003/0139921 A1 * | 7/2003 | Byrd | G06F 17/2775 |
| | | | 704/10 |
| 2003/0215137 A1 * | 11/2003 | Wnek | G06K 9/00469 |
| | | | 382/181 |
| 2004/0249824 A1 * | 12/2004 | Brockway | G06F 17/3061 |
| 2007/0136243 A1 * | 6/2007 | Schorn | G06F 17/30613 |
| 2010/0293159 A1 * | 11/2010 | Zhang | G06F 17/30985 |
| | | | 707/728 |
| 2011/0307477 A1 * | 12/2011 | Dasari | G06F 17/30489 |
| | | | 707/723 |
| 2012/0191716 A1 | 7/2012 | Omoigui | |
| 2012/0271813 A1 * | 10/2012 | Shen | G06F 17/30312 |
| | | | 707/711 |
| 2012/0278341 A1 * | 11/2012 | Ogilvy | G06Q 10/00 |
| | | | 707/749 |
| 2012/0330972 A1 | 12/2012 | Bhagwan et al. | |
| 2013/0151538 A1 * | 6/2013 | Dmitriev | G06F 17/30616 |
| | | | 707/750 |
| 2013/0346424 A1 * | 12/2013 | Zhang | G06F 17/30616 |
| | | | 707/750 |
| 2014/0317113 A1 * | 10/2014 | Cox | G06F 17/30598 |
| | | | 707/737 |
| 2015/0019216 A1 * | 1/2015 | Singh | G10L 15/183 |
| | | | 704/235 |
| 2015/0066968 A1 | 3/2015 | Bastide et al. | |
| 2015/0134666 A1 * | 5/2015 | Gattiker | G06F 17/30598 |
| | | | 707/739 |
| 2015/0309990 A1 | 10/2015 | Allen et al. | |
| 2016/0117551 A1 * | 4/2016 | Hausmann | G06K 9/00463 |
| | | | 382/161 |

OTHER PUBLICATIONS

Oracle®, "Oracle Outside in Technology", © 2014, pp. 1-3.
Microsoft, "Tools to Get Work Done", Microsoft Office © 2014, pp. 1-3, https://products.office.com/en-US/.
IBM, "IBM SPSS Statistics Editions", IBM Software Business Analytics, © 2013, pp. 1-8.
IBM, "Analyzing survey text: a brief overview", IBM Software Business Analytics, © 2010, pp. 1-12.
Oliver et al., "Apache POI—the Java API for Microsoft Documents", printed on Nov. 26, 2014, http://poi.apache.org/, pp. 1-2.
Apache, "ODFDOM—The Opendocument API", Apache Incubator, http://incubator.apache.org/odftoolkit/odfdom/index.html, ©2011, pp. 1-2.
Mell et al., "The NIST Definition of Cloud Computing", National Institute of Standards and Technology, Special Publication 800-145, Sep. 2011, 7 pages.
IBM: List of IBM Patents or Patent Applications Treated as Related (Appendix P), May 11, 2016, pp. 1-2.

* cited by examiner

INGESTION PLANNING FOR COMPLEX TABLES

BACKGROUND

The present invention relates generally to the field of document processing, and more particularly to analysis of ingestion of multi-formatted tables in a document.

In an unstructured information system, information sources are main component yielding analytical results. For many domains such as science, medicine, or finance, documents may contain complex tables with embedded textual content. Isolated tables may not be as valuable as tables in context. Table with associated contextual content may be difficult to process due to multiple formatting styles or other errors typically associated with, styling, Object Linking and Embedding (OLE) extraction or Optical Character Recognition (OCR) extraction. Ingestion of tables into unstructured information systems may be inefficient in both time and resources used.

SUMMARY

It may be advantageous to minimize errors associated with traditional data extraction by optimizing ingestion plans for documents containing tables and contextual content associated with a table. Embodiments of the present invention disclose a method, computer program product, and system for generating a plan for document processing. A plurality of electronic documents are received from a data store, by a computer using a network. The plurality of electronic documents are analyzed, using the computer to identify a plurality of tabular data by performing a search for one or more table markers, based on the analyzed plurality of electronic documents. Textual data within the identified tabular data are identified, by performing a first natural language search of the analyzed plurality of electronic documents. Textual hints are generated, based on the identified textual data within the identified tabular data by associating identified textual data into a set using a second natural language search. The generated textual hints are mapped to a lookup set. References are identified, wherein references are based on mapped textual hints with associated identified textual data in the received plurality of electronic documents. A count of identified references are determined A priority score is calculating based on the count of identified references, wherein the calculating further comprises multiplying the count of identified references by a predetermined scale value. In response to receiving a priority score modifying value, wherein the priority score modifying value is a numerical value, a modified priority score is calculated, wherein the calculating further comprises multiplying the priority score by the received priority score modifying value. One or more ingestion plans are generated based on the modified priority score. The one or more generated ingestion plans are communicated by the computer using the network.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As presented in various embodiments of the invention, it may be advantageous for a system to identify the relative importance of embedded structured data within documents. Priority given to structured data of higher importance may allow efficiency in ingestion of structured data and the documents that contain said data.

Figure 1:
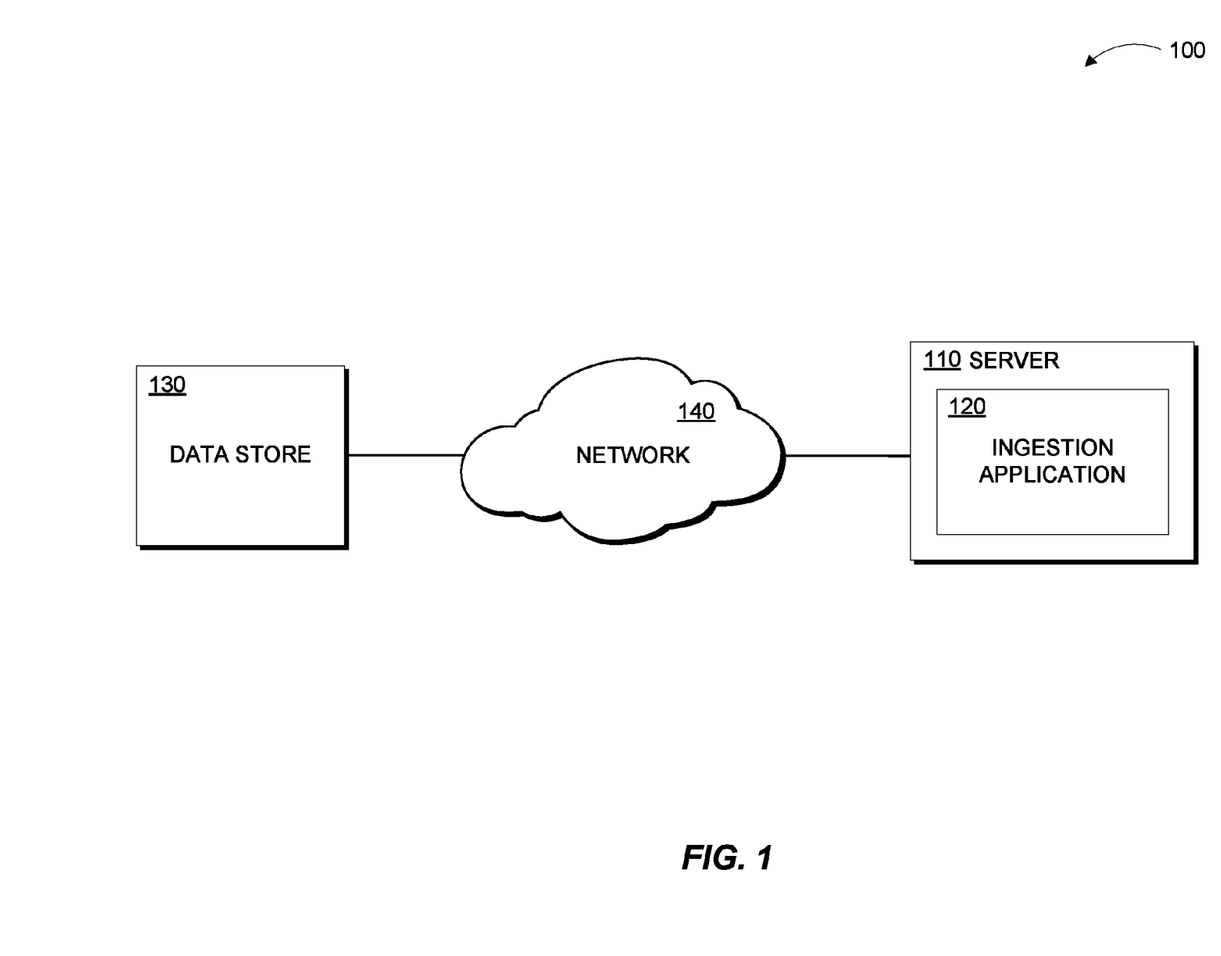
FIG. 1 is a functional block diagram illustrating a distributed data processing environment, in accordance with an embodiment of the present invention.

Embodiments of the present invention will be described with reference to the Figures. Referring to FIG. 1, a general distributed data processing environment 100 is illustrated, in accordance with an embodiment of the present invention. Distributed data processing environment 100 includes server 110 and data store 130 interconnected through over network 140.

Network 140 may include permanent connections, such as wire or fiber optic cables, or temporary connections made through telephone or wireless communications. Network 140 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 140 may also include a number of different types of networks, such as, for example, an intranet, a local area network (LAN), or a wide area network (WAN).

Each of server 110 and data store 130 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 4 below. In various embodiments, server 110 may be a separate server or series of servers, a database, or other data storage, internal or external to data store 130. Additionally, data store 130 may be any computer readable storage media accessible via network 140. Data store 130 may index received electronic documents to be communicated to server 110, in accordance with an embodiment of the invention.

Figure 2:
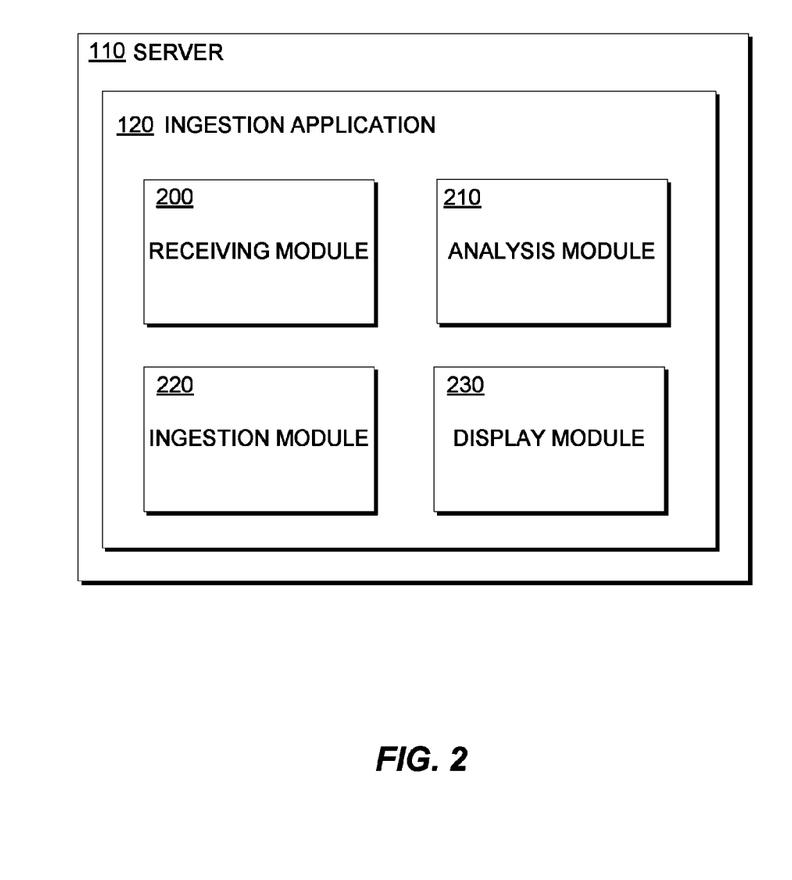
FIG. 2 is a functional block diagram illustrating the components of an application within the distributed data processing environment, in accordance with an embodiment of the present invention.

Server 110 includes ingestion application 120, as described in more detail in reference to FIG. 2. In various embodiments, server 110 operates generally to receive inputs, process a set of received electronic documents based on the received inputs, analyze received electronic documents, communicate analysis results, for example, ingestion plans, for display or storage for later processing, and host applications, for example ingestion application 120, which may process and/or store data.

Ingestion application 120 may be, for example, database oriented, computation oriented, or a combination of these. Ingestion application 120 may operate generally to receive and process electronic documents from a data store, for example, data store 130, via server 110. Received documents may contain structured data of various formats, for example, XML, HTML, PDF, various pictorial data, etc.

Ingestion application 120 may receive electronic documents from a data store, for example, data store 130, via server 110. Ingestion application 120 may analyze the received document for table markers, for example performing a search for an Extensible Markup Language formatting, Unstructured Information Management Architecture formatting, or OpenDocument formatting, for table markers within structured data embedded in the document. In various filing formats table markers may be identified by the operation <TABLE> indicating a tabular structure is present. Ingestion application 120 may scan the tabular data for any textual data within and index the textual data in a data store in memory as textual hints associated with the tabular data. In various embodiments, tabular data may be linked data, for example, Pivot Tables or Linked Data Tables, or Object Linking and Embedding Tables. The received electronic document may be rescanned, by ingestion application 120, in order to extract textual data within the electronic document, which match or are associated with the textual hints, or "references." A number of paragraphs around the textual data may be scanned for references. The number of paragraphs may be predetermined, or ingestion application 120 may use scoping operation, for example <scope="col"> or <scope="row"> to identify textual data around tabular data using the tabular data as borders for analysis, for scanning of references.

Ingestion application 120 may index references and associated tabular data and generate a priority score based on a count of references associated with a particular set of tabular data. An ingestion plan may be generated by ingestion application 120 based on an order of tabular data. In various embodiments, order in which the tabular data is index may be based on the priority score. Ingestion application 120 may store the ingestion plan, communicate the ingestion plan, or load the document in response to executing the ingestion plan on a computing device, for example, server 110.

Referring to FIG. 2, FIG. 2 is a functional block diagram illustrating the components of ingestion application 120 within the distributed data processing environment 100 of FIG. 1. Ingestion application 120 includes receiving module 200, analysis module 210, ingestion module 220, and display module 230.

In reference to FIGS. 1 and 2, receiving module 200 may act generally to receive inputs from and/or a document or sets of documents from a device, for example, data store 130. In an embodiment of the present invention, receiving module 200 may receive a document containing tabular data and/or textual data that may be structured or unstructured. Receiving module 200 may communicate the received document or set of documents, to analysis module 210 for further processing or store the received document or set of documents in a data store in memory.

Analysis module 210 may act generally to receive electronic documents, analyze received documents for tabular data, search identified tabular data for textual hints, search received electronic documents for textual data matching identified textual hints, index tabular data in a list, generate an ingestion plan, store the ingestion plan in a data store in memory, communicate the ingestion plan, or load the received documents in response to executing the ingestion plan on a computing device, for example, server 110.

Analysis module 210 may use traditional techniques to load documents in memory, for example, Apache POI, Apache UIMA, Apache ODFDOM, OCR, or other methods. Analysis module 210 may receive electronic documents from a data store, for example, data store 130, via server 110. Analysis module 210 may receive the electronic documents via traditional techniques to load documents in memory, for example, Apache POI, Apache UIMA, Apache ODFDOM, OCR, or other methods.

Analysis module 210 may perform a search of the received documents scanning for table markers. Table markers may be any structure in the electronic document indicating a table, for example, OLE embedded markers or XML <TABLE>. In various embodiments, if nested tables, or tabular data within a table, are identified, analysis module 210 may pass over those table markers, but may identify nested table markers in a subsequent scan or marker search. In various embodiments analysis module 210 may isolate tabular data and perform a search for nested tabular data.

Analysis module 210 may extract textual hints from identified tabular data. For example, a natural language search or metadata analysis may be used to extract textual data from identified tabular data. Textual hints may be, for example, table titles, reference names, column headers, row headers, words in a tabular region, and/or metadata associated with tabular data. In various embodiments, raw data text elements may be extracted and data-driven mapping may be used.

In an embodiment data-driven mapping may be used to generate a lookup set for all identified textual hints, for example, "Lookup" in Structured Query Language. Analysis module 210 may analyze the non-tabular data in the received documents, for example, with a search, to identify textual data or words in non-tabular data that match textual data or words associated with the textual hints. These matching words may be referred to as "table references."

In various embodiments, analysis module 210 may only search a number of paragraphs around tabular data and not the entirety of the document. The limited search may be used when time or resource limitations are necessary. The number of paragraphs to be searched around tabular data may be determined by a predetermined number of paragraphs or analysis module 210 may use a scoping operation, as described above to detect tabular data and search the paragraphs between tabular data, or use the tabular data as borders for the search of references. Analysis module 210 may store or communicate the tabular markers, textual hints, and identified references to ingestion module 220.

Ingestion module 220 may act generally to receive tabular and textual data, prioritize tabular data, generate ingestion plans, and store, communicate, or execute ingestion plans. Ingestion module 220 may receive tabular markers, textual hints and identified references communicated from analysis module 210. Ingestion module 220 may index, in a data store in memory, the received tabular data with the associated textual hints and references. Ingestion module 220 calculate a priority score, based on a determination of a count of references for each set of tabular data. In various embodiments natural language analysis may be used to determine categories for references and textual hints associated with tabular data.

Ingestion module 220 may generate an ingestion plan based on the priority score associated with each set of tabular data. The ingestion plan may list the sets of tabular data, from highest priority score to lowest or vice versa, and generate a corresponding list of documents in the same order as the list of associated sets of tabular data. In various embodiments, the ingestion plan may be altered due to a modification of the priority score. Ingestion module 220 may calculate a percent value corresponding to the percent of total textual data of the received document matches the textual hints. The priority score may be modified by the percent value. In various embodiments a percent value may be a percent of textual data of the document matching the references. For example, if a set of tabular data has relatively few references, thus a relatively low priority score, but those references make up a relatively high percentage of the overall textual data in the document, the priority score for that set of tabular data may be increased.

In various embodiments the percent value may be a percent of the set of tabular data matched in the textual data. For example, if 90% of the textual data within a set of tabular data is also located in the textual data of the document, the set of tabular data may have a relatively high percent value, which may increase the priority score. In various embodiments of the invention, ingestion module 220 may store the ingestion plan, execute the ingestion plan on a computing device, for example, server 110, or communication the ingestion plan display module 230, for display on a computing device.

Display module 230 may act generally to communicate ingestion plans, tabular data and/or associated textual data, to be displayed, server 110 or another computing device within the distributed data processing environment 100, through network 140. Display module 230 may receive communications from analysis module 210, for example, a generated ingestion plan. In various embodiments, display module 230 may receive user input, for example, selecting tabular data for ingestion not in the ingestion plan, or input modifying the ingestion plan, which may be communicated to analysis module 210.

Figure 3:
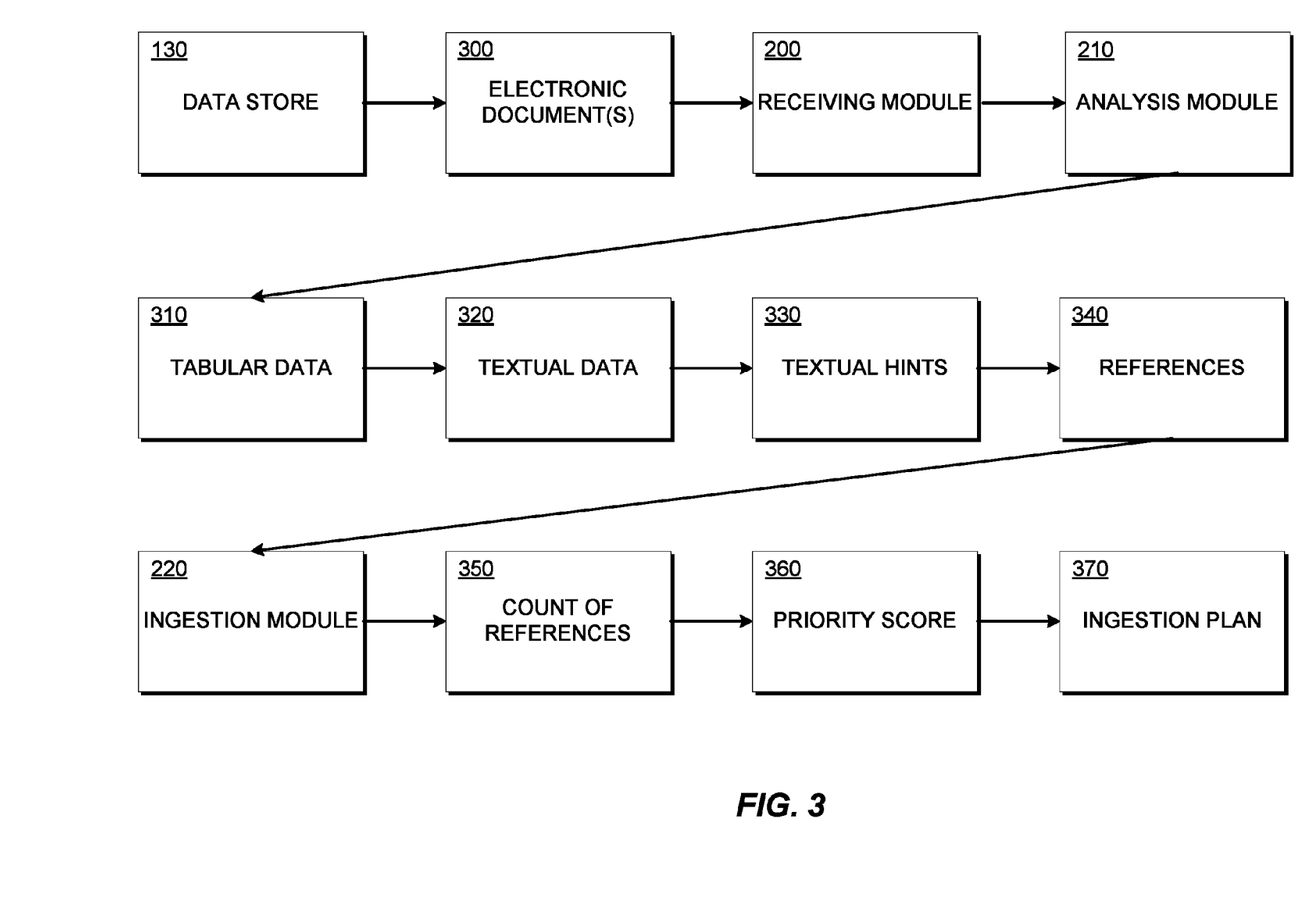
FIG. 3 is a schematic block diagram of an application within the distributed data processing environment, in accordance with an embodiment of the present invention.

Referring to FIG. 3, FIG. 3 is a schematic block diagram of the execution of ingestion application 120, within the distributed data processing environment, in accordance with an embodiment of the present invention. Referring now to FIGS. 1, 2, and 3, in various embodiments, data store 130 communicates one or more electronic documents 300 to receiving module 200. Receiving module 200 receives one or more electric documents 300, through a network, for example network 140. Receiving module 200 communicates the received document(s) 300 to analysis module 210 for further processing. Analysis module 210 identifies a plurality of tabular data 310 within the analyzed plurality of received electronic documents 300.

Textual data 320 is identified by analysis module 210 within the tabular data 310, as described above. One or more textual hints 330 are generated by analysis module 210 based on the textual data 320 within tabular data 310. In various embodiments, textual hints 330 may be indexed, stored in memory, or categorized semantically using natural language processing.

References 340 are identified by analysis module 210 by matching textual hints 330 with other textual data within the received plurality of electronic documents 300. The other textual data may be located without the tabular data 310. Tabular data 310, textual data 320, textual hints 330, and references 340 are communicated to ingestion module 220 for further processing.

Ingestion module 220 calculated a count of references 350 based on the number of received references 340. In various embodiments, the count of references 350 may be a linear scale, for example, if ingestion module 220 receives 5 references 340, the count of references 350 will be 5, or any other appropriate scale. Ingestion module 220 calculates a priority score 360, based on the calculated count of references 350. Ingestion module 220 generates an ingestion plan 370, based on the calculated priority score 360. The ingestion plan 370 may be stored in memory, communicated to another module or computing device, or executed by ingestion module 220.

Figure 4:
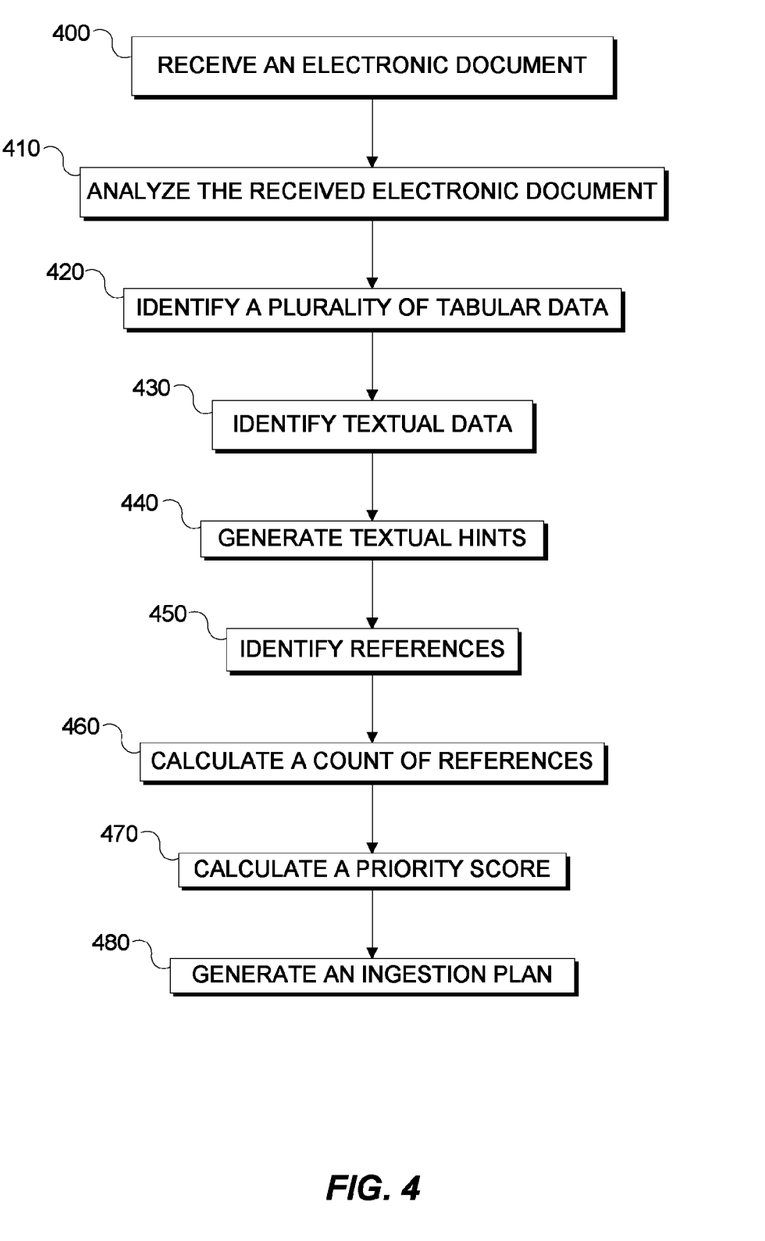
FIG. 4 is a flowchart depicting operational steps of an ingestion application, on a server computer within the data processing environment of FIG. 1, in accordance with an embodiment of the present invention.

Now referring to FIG. 4, FIG. 4 is a flowchart depicting operational steps of ingestion application 120, on server 110 within the data processing environment of FIG. 1, in accordance with an embodiment of the present invention. Referring now to FIGS. 1, 2, and 4, in step 400, receiving module 200 receives an electronic documents from a computing device, for example, data store 130, via server 110, through network 140. The documents may be in electronic format, for example, HTML, XML, or OCR extracted. In various embodiments, the electronic documents may be preloaded onto data store 130. Receiving module communicates received documents to analysis module 210 and, in step 410, analysis module 210 analyzes the received electronic documents by performing a search for table markers, which identify tabular data. The search may be performed by scanning the electronic document for structured indicating a table, for example, OLE embedded markers or XML <TABLE>. In various embodiments, the identified tabular data may be nested or un-nested as described above. In step 420, analysis identifies a plurality of tabular data based on the identified table markers indicative of tabular data within the electronic document.

In step 430, analysis module 210 identifies a textual hints. Textual hints are extracted from the plurality of tabular data, which represent textual data within the plurality of tabular data. For example, a natural language search or metadata analysis may be used to extract textual data from identified tabular data. Analysis module 210 generates textual hints, in step 440, based on the identified textual data. Textual hints may be, for example, table titles, reference names, column headers, row headers, words in a tabular region, and/or metadata associated with tabular data.

In step 450, analysis module 210 identifies references within the electronic document. References are identified with a search, and represent textual data or words in non-tabular data of the electronic document, that match textual data or words associated with, or within, the identified textual hints. The matched words may be referred to as "references" as described above.

Analysis module 210 communicates tabular data, textual hints and references to ingestion module 220 and, in step 460, ingestion module 220 calculates a count of references for the identified plurality of identified tabular data. In various embodiments, the count may be one count for each reference or a scalable count, which may be predetermined or calculated by ingestion module 220. In step 470, ingestion module 220 calculates a priority score. The priority score is based on the calculated count of references. The priority score may be modified as described below, in reference to FIG. 4. Ingestion module generates an ingestion plan, in step 480, based on the priority score. In various embodiments, the ingestion plan may be stored in memory, communicated to another module or application on a computing device, or executed by ingestion application 120.

Figure 5:
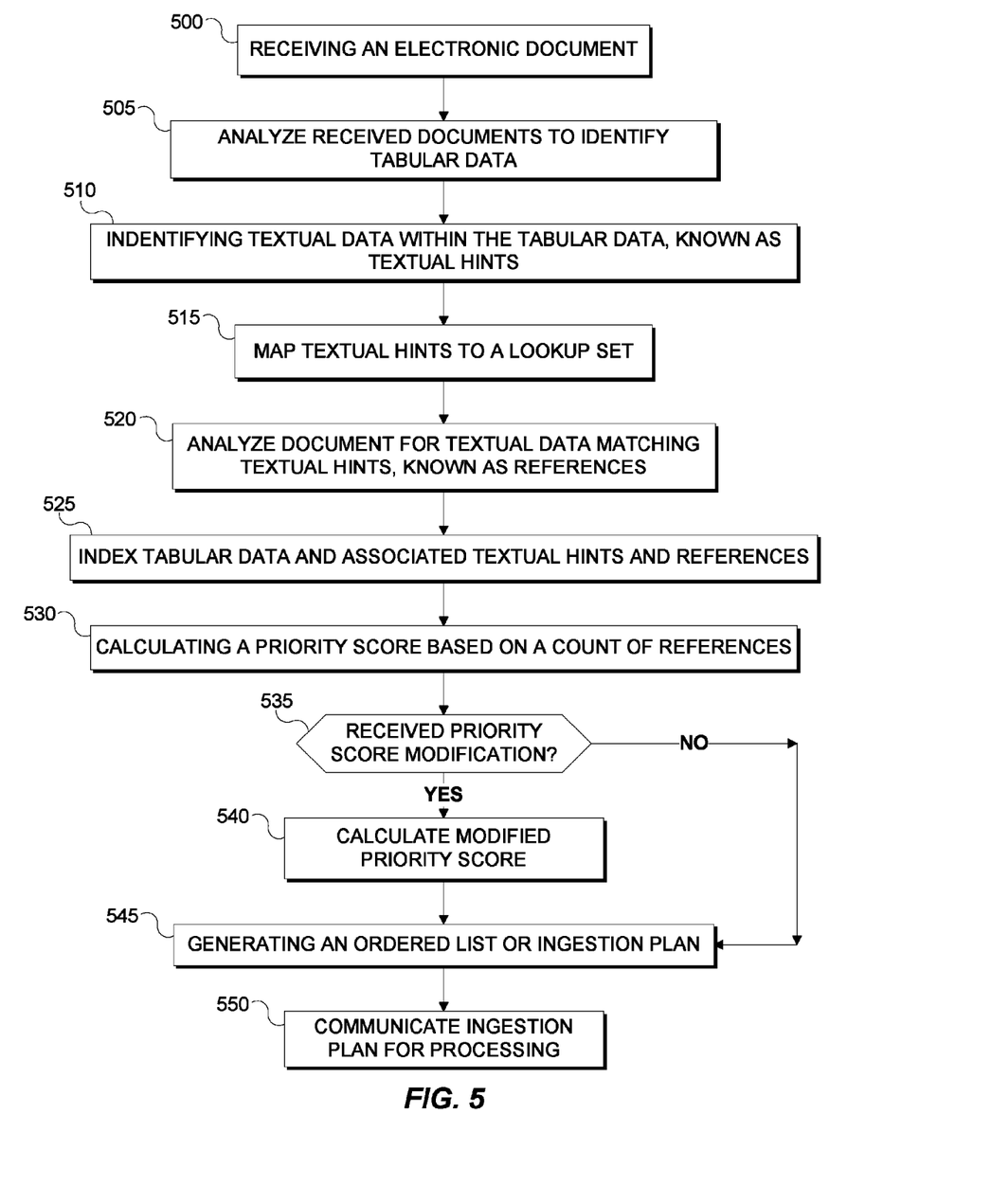
FIG. 5 is a flowchart depicting operational steps of an ingestion application, on a server computer within the data processing environment of FIG. 1, in accordance with an embodiment of the present invention.

FIG. 5 is a flowchart depicting an additional embodiment of the operational steps of ingestion application 120, on server 110 within the data processing environment of FIG. 1. Referring now to FIGS. 1, 2, and 5, in step 500, receiving module 200 receives electronic documents from a computing device, for example, data store 130, via server 110. Receiving module communicates received documents to analysis module 210 and, in step 505, analysis module 210 performs a search of the received documents to search for table markers, as described above. In various embodiments, the identified tabular data may be nested or un-nested as described above.

In step 510, analysis module 210 identifies or extracts textual hints from identified tabular data. For example, a natural language search or metadata analysis may be used to extract textual data from identified tabular data. Textual hints may be, for example, table titles, reference names, column headers, row headers, words in a tabular region, and/or metadata associated with tabular data. Analysis module 210 uses data-driven mapping to generate a lookup set for all identified textual hints, in step 515. In step 520, analysis module 210 analyzes the non-tabular data in the received documents, for example, with a search, to identify textual data or words in non-tabular data that match textual data or words associated with the textual hints. The matched words may be referred to as "references" as described above.

Analysis module 210 communicates tabular data, textual hints and references to ingestion module 220 and, in step 525, ingestion module 220 indexes, in a data store in memory, the received tabular data with the associated textual hints and references. Ingestion module 220 calculates a count of references for each associated set of tabular data and, in step 530, calculates a priority score based on the count of references for each associated set of tabular data. For example, if a set of tabular data is indexed with 5 references, ingestion module 220 may calculate a priority score of 5 and associate the priority score with the set of tabular data.

In decision step 535, ingestion module 220 may receive a priority score modifier. In various embodiments, the priority score modifier may be from received user input, or a determination made by ingestion module 220, as described above. If the priority score is modified, in response to an input or determination, decision step 535 "YES" branch, ingestion module 220 calculate a new or modified priority score, in step 540, and stores the modified priority score with an associated set of tabular data, in memory. Ingestion module 220 orders one or more sets of tabular data in a list, wherein the order is based on the modified priority score, and, in step 545, generates an ingestion plan based on the ordered list of sets of tabular data, If the priority score is not modified, decision step 535 "NO" branch, ingestion module 220 orders one or more sets of tabular data, wherein the order is based on the priority score, and generates an ingestion plan based on the priority score, in step 545.

In step 550, ingestion module 220 communicates the generated ingestion plan to a computing device for execution of the ingestion plan. In various embodiments, ingestion module 220 stores the ingestion plan for subsequent processing or executed the ingestion plan on server 110 within or without ingestion application 120.

Figure 6:
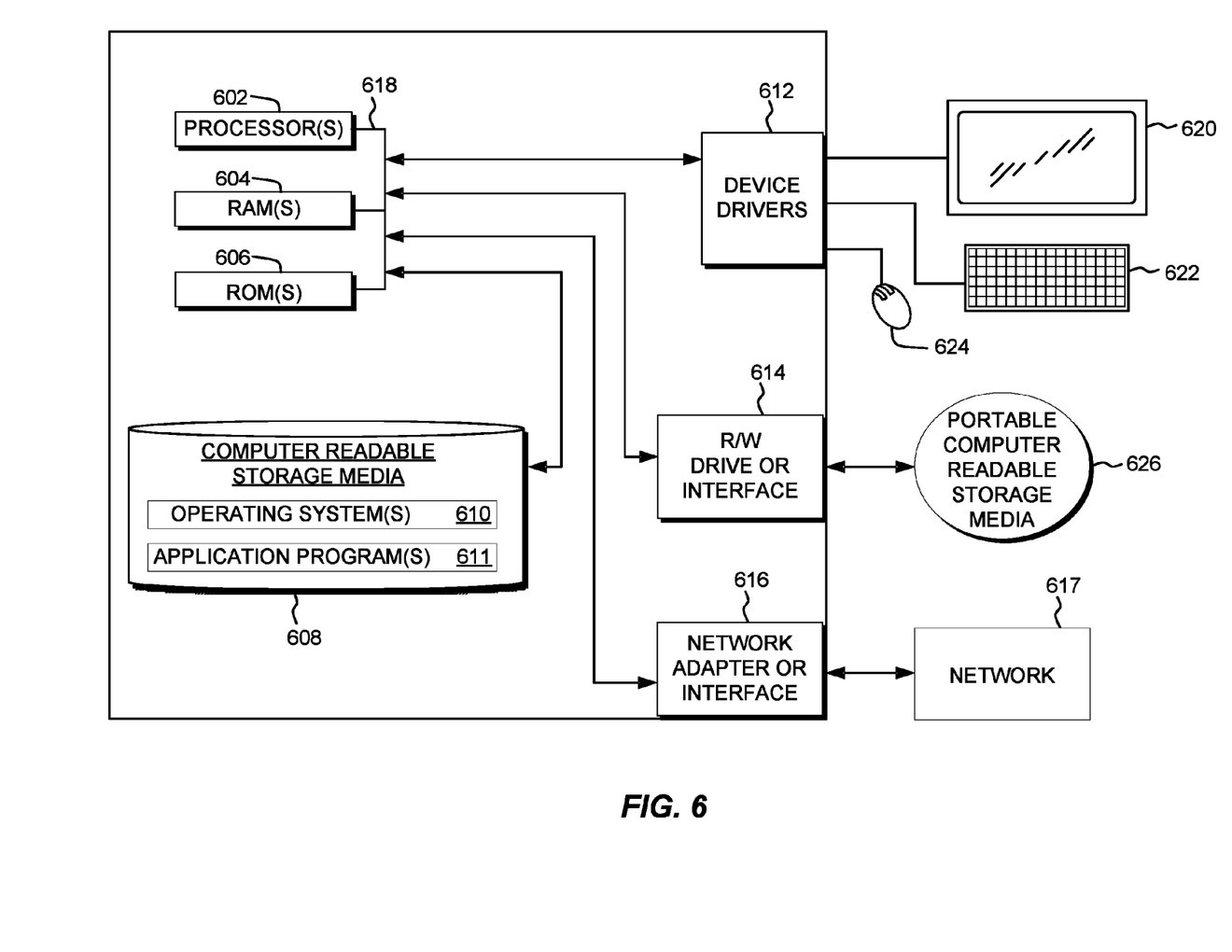
FIG. 6 depicts a block diagram of components of the server computer executing the ingestion application, in accordance with an embodiment of the present invention.

Referring to FIG. 6, FIG. 6 depicts a block diagram of components of server 110 and data store 130 FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Server 110 and data store 130 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, ingestion application 120, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 and data store 130 may also include a R/W drive or interface 614 to read from and write to one or more portable computer readable storage media 626. Application programs 611 on server 110 and data store 130 may be stored on one or more of the portable computer readable storage media 626, read via the respective R/W drive or interface 614 and loaded into the respective computer readable storage media 608.

Server 110 and data store 130 may also include a network adapter or interface 616, such as a TCP/IP adapter card or wireless communication adapter (such as a 4G wireless communication adapter using OFDMA technology) for connection to a network 617. Application programs 611 on server 110 and data store 130 may be downloaded to a computing device, for example, server 110, from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Server 110 and data store 130 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

Figure 7:
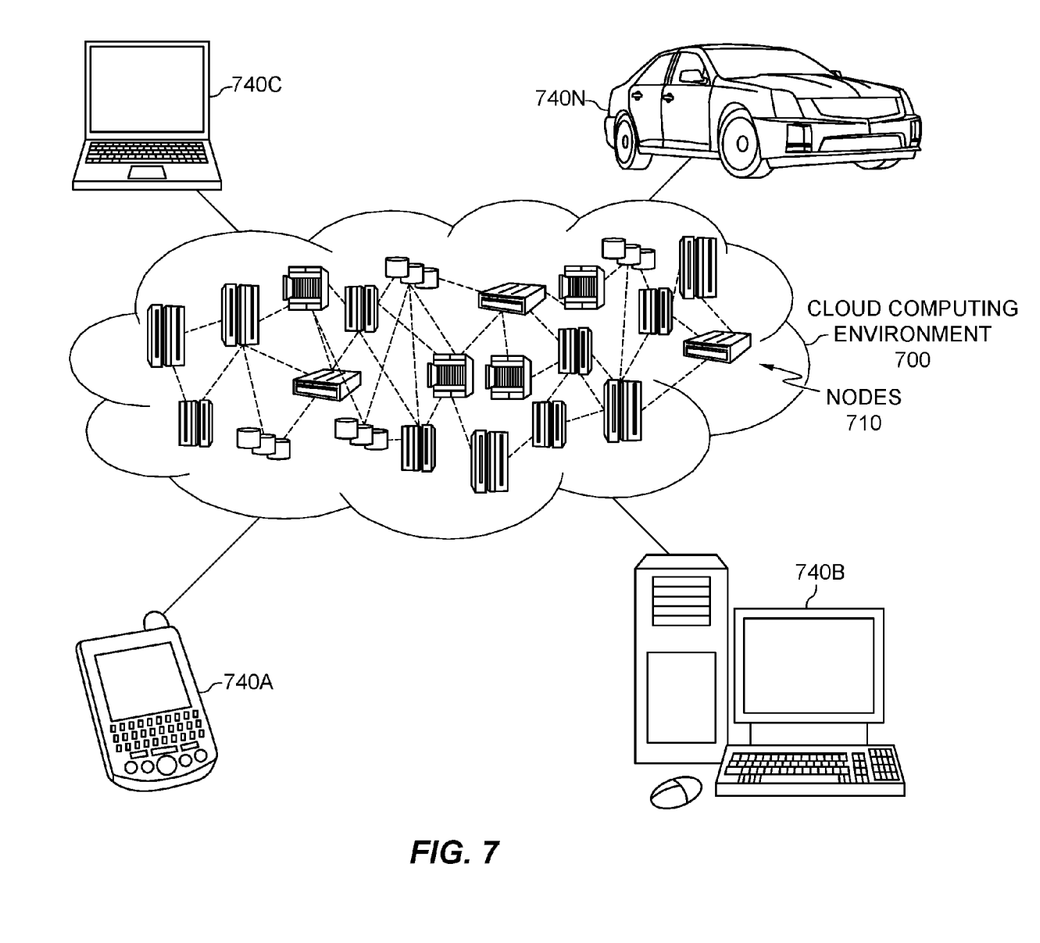
FIG. 7 is a schematic block diagram of an illustrative cloud computing environment, according to an aspect of the present invention.

Referring now to FIG. 7, illustrative cloud computing environment 700 is depicted. As shown, cloud computing environment 700 comprises one or more cloud computing nodes 710 with which local computing devices used by cloud consumers, such as, for example, personal digital assistant (PDA) or cellular telephone 740A, desktop computer 740B, laptop computer 740C, and/or automobile computer system 740N may communicate. Computing nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740A-N shown in FIG. 7 are intended to be illustrative only and that computing nodes 710 and cloud computing environment 700 can communicate with any type of computerized device over any type of network and/or network addressable connection (e.g., using a web browser).

Figure 8:
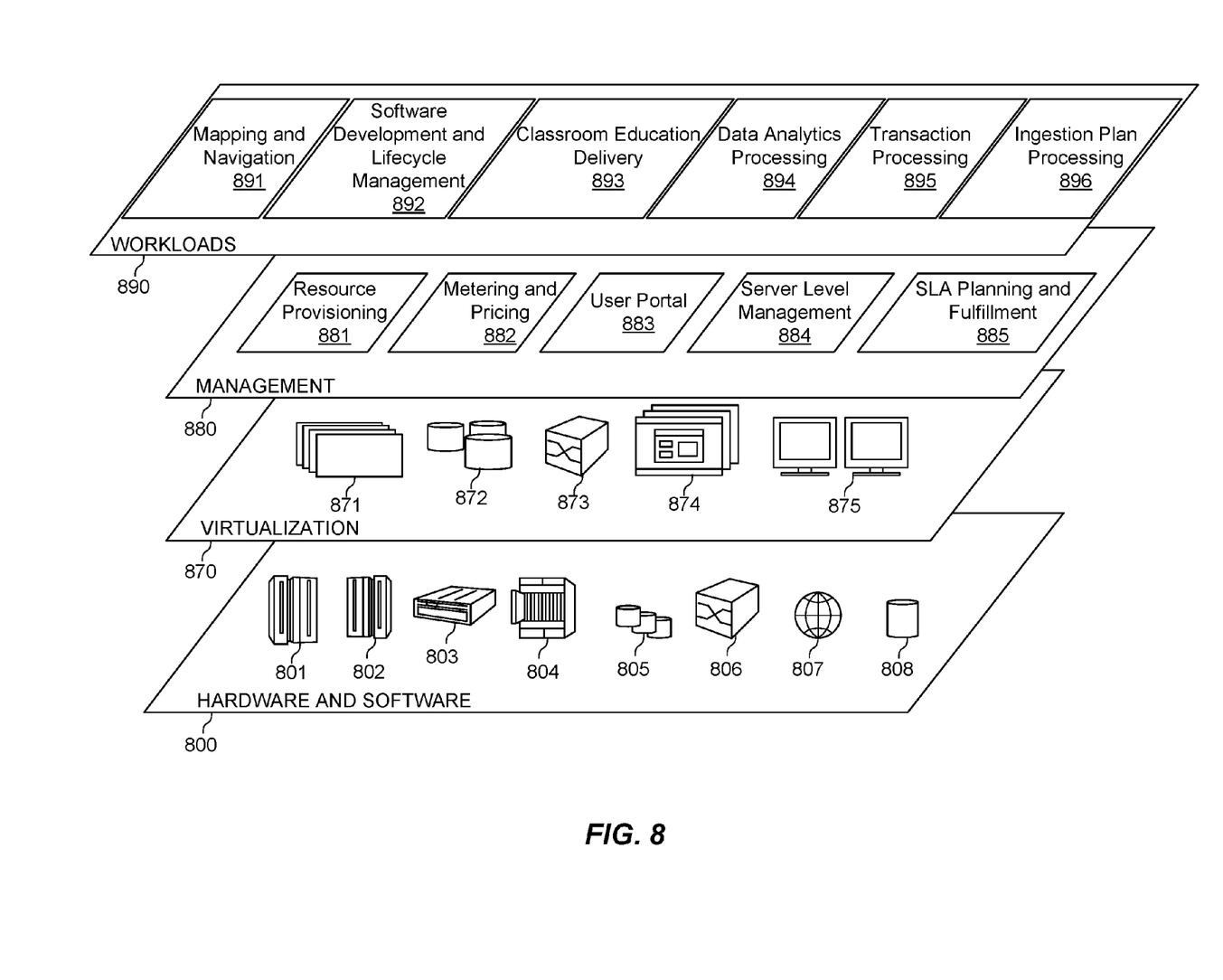
FIG. 8 is a multi-layered functional illustration of the cloud computing environment of FIG. 7, according to an embodiment of the present invention.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 800 includes hardware and software components. Examples of hardware components include: mainframes 801; RISC (Reduced Instruction Set Computer) architecture based servers 802; servers 803; blade servers 804; storage devices 805; and networks and networking components 806. In some embodiments, software components include network application server software 807 and database software 808.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and ingestion plan processing 896.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for generating a plan for document processing, the method comprising:
    receiving a plurality of electronic documents from a data store, by a computer using a network;
    analyzing the plurality of electronic documents, using the computer to identify a plurality of tabular data by performing a search for one or more table markers, based on the analyzed plurality of electronic documents;
    identifying textual data within the identified tabular data, by performing a first natural language search of the analyzed plurality of electronic documents;
    generating textual hints, based on the identified textual data within the identified tabular data by associating identified textual data into a set using a second natural language search;
    mapping the generated textual hints to a lookup set;
    identifying references, wherein references are based on mapped textual hints with associated identified textual data in the received plurality of electronic documents;
    determining a count of identified references;
    calculating a priority score based on the count of identified references, wherein the calculating further comprises multiplying the count of identified references by a predetermined scale value;
    in response to receiving a priority score modifying value, wherein the priority score modifying value is a numerical value, calculating a modified priority score, wherein the calculating further comprises multiplying the priority score by the received priority score modifying value;
    generating one or more ingestion plans, the one or more ingestion plans comprising an ordered list of the identified references and associated tabular data, where ordering of the ordered list is based at least in part on the modified priority score; and
    communicating the one or more generated ingestion plans by the computer using the network.

* * * * *